Oct. 13, 1925.
C. DRIEST, JR
1,556,770
SHEARS
Original Filed Aug. 4, 1923
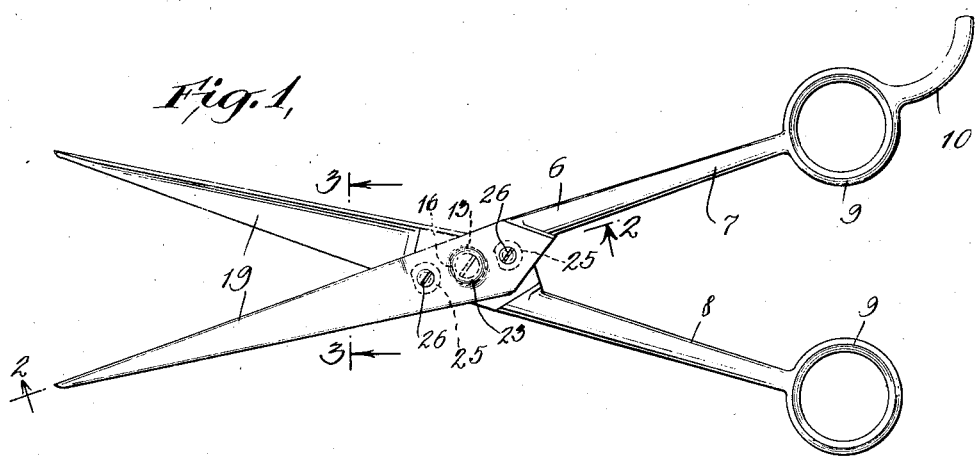
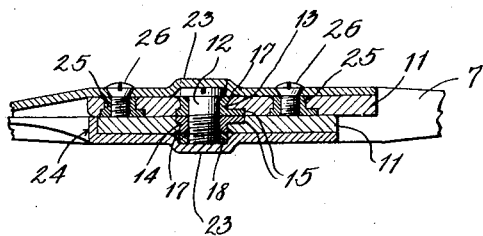
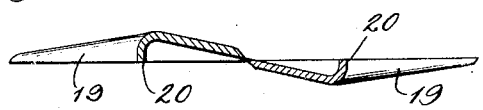
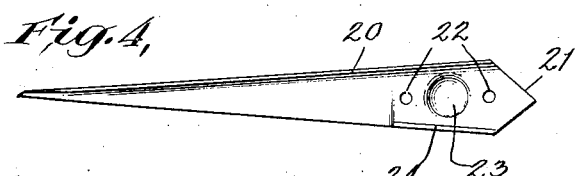
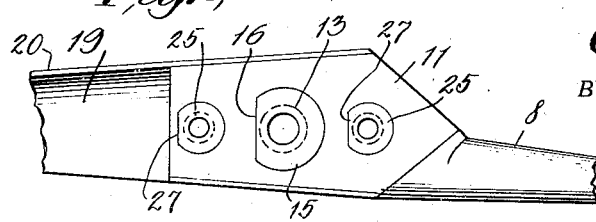
INVENTOR
Charles Driest Jr.
BY
ATTORNEYS Patented Oct. 13, 1925.

1,556,770

UNITED STATES PATENT OFFICE.

CHARLES DRIEST, JR., OF MARLBORO, NEW JERSEY.

SHEARS.

Application filed August 4, 1923, Serial No. 655,608. Renewed April 15, 1925.

*To all whom it may concern:*

Be it known that I, CHARLES DRIEST, Jr., a citizen of the United States, and residing at Marlboro, in the county of Monmouth and State of New Jersey, have invented certain new and useful Improvements in Shears, of which the following is a specification, such as will enable those skilled in the art to which it appertains to make and use the same.

This invention relates to shears of various kinds and classes such for example as dressmakers' shears, barbers' shears and the like; and the object of the invention is to provide a device of the class specified with handle members which are pivotally connected together and with blade members detachably mounted in connection with the separate handle members, without dissecting the pivotal connections of said handle members; a further object being to construct the handle members and blade members of different grades of material and to provide bushings for the handle members where the screws or other devices are passed therethrough for detachably connecting the handle members and the blade members of the handle members as well as to provide bearing faces of hard, strong and durable material on which the handle members may operate; a further object being to provide blade members which are so constructed as to conceal and cover the pivotal connections of the handle members; and with these and other objects in view, the invention consists in a pair of shears of the class and for the purpose specified which is simple in construction, efficient in use and which is constructed as hereinafter described and claimed.

The invention described and claimed herein is an improvement on that shown and described in a pending application, filed by me November 18, 1922 and bearing Serial No. 601,781, and is fully disclosed in the following specification of which the accompanying drawing forms a part, in which the separate parts of my improvement are designated by suitable reference characters in each of the views, and in which:—

Fig. 1 is a plan view of a pair of shears made according to my invention and with the handle members and blade members thereof in an open position.

Fig. 2 is a partial section on the line 2—2 of Fig. 1 on an enlarged scale.

Fig. 3 is a section on the line 3—3 of Fig. 1 on an enlarged scale.

Fig. 4 is an inside plan view of one of the blade members which I employ; and,

Fig. 5 is an inside view of one blade member and handle member and showing the central portion thereof.

In carrying my invention into effect, I provide a pair of shears 6 such as employed by barbers and composed of two handle members 7 and 8 having loops or eyes 9 at their free ends to receive the fingers of a hand, and one of said loops or eyes being provided with a hook-shaped extension 10. The other end portions of the handle members 6 and 7 are flattened and are of less dimensions than said handle members as shown at 11 and are pivoted together by a screw 12 which in, the construction shown, passes freely through a bushing 13 on the handle member 7 and is in threaded engagement with a bushing 14 on the handle member 8.

The bushings 13 and 14 are of similar construction and consists of sleeves having enlarged or flanged slots 15 cut away as shown at 16 to key the same against rotation in the handle members 7 and 8 as clearly shown in Fig. 5 of the drawing, and the bushings 13 and 14 are retained in position by spinning the free or outer ends thereof into countersunk apertures in the handle members 7 and 8 as shown at 17 in Fig. 2 of the drawing. A nut 18 is mounted upon the end of the screw 12 to retain and lock the handle members in predetermined position.

I also employ two blade members 19 which are of similar construction and are fashioned from sheet metal suitably treated to render the same hard and strong and durable, and these blade members are in the form of a long pointed strip of metal one edge portion of which is curved at substantially right angles to form a strengthening rib or flange 20 which extends substantially to the pointed end of the blade members and the enlarged end portion of the blade members is V-shaped in form as shown at 21 to fit into the reduced portions of the handle members 7 and 8 and said end portions of the blade members are provided with two small apertures 22 between which the blade member is pressed outwardly as shown at 23 to receive the head of the screw 12 and the nut 18 mounted in the screw. The enlarged portion of the blade members is also provided with a flange 24 at the opposite side of the flange or rib portion 20 and extend a comparatively short distance longitudinally of the blade members and which is adapted to reinforce said blade members and to overlap the edge of the handle members as will be apparent.

The handle members 7 and 8 or the reduced and flattened portions 11 thereof are provided with bushings 25 substantially similar to the bushings 13 and 14 but of smaller size and into which the screws 26 are adapted to pass for retaining the blade members 19 in connection with the handle members 7 and 8. In other words, the bushings 25 are keyed against rotation by flattened portions 27 thereon and are held in place by spinning or otherwise.

The distinctive features of my invention reside in the provision of the specific bushings which I employ, and the keying of said bushings in the handle members, said bushings providing strong and durable means for detachably mounting the handle members. The comparatively wide faces of the bushings 13 and 14 also form bearings on which the handle members are free to operate, said bushings taking up the wear and by pressing out the material of the blade members to receive the head of the screw 12, the nut 18 operates to strengthen the blade members and also forms a neat and finished appearance to the complete shear, in that the screw and nut are concealed.

It will be understood that the handle members 7 and 8 are preferably formed by die-casting, in which a comparatively soft metal is employed, and it will be understood that the bores or apertures into which the bushings are placed will be die-cast in the handle member, and by reason of the structure shown, said bushings will be keyed or locked therein and form durable means for retaining the several parts in position as above set out.

It will also be apparent that with my improved shear construction, the blade members 19 may be attached and detached at will without removing the pivotal connection of the handle members, thus facilitating the substitution of new blade members when desired, and while I have shown certain details of construction for carrying my invention into effect, it will be understood that I am not necessarily limited to these details and various changes therein and modifications thereof may be made within the scope of the appended claims without departing from the spirit of my invention or sacrificing its advantages.

Having fully described my invention, what I claim as new and desire to secure by Letters Patent, is:—

1. A tool of the class described comprising pivotally connected handle members, blade members formed independently of said handle members and adapted to be secured to the separate handle members, means passed through said blade members and into said handle members for detachably connecting said blade members with said handle members, said blade members overlying the pivotal connection of the handle members and being detachably mounted in connection with the handle members without removing the pivotal connection of said handle members.

2. A tool of the class described comprising pivotally connected handle members, blade members formed independently of said handle members and adapted to be secured to the separate handle members, means passed through said blade members and into said handle members for detachably connecting said blade members with said handle members, said blade members overlying the pivotal connection of the handle members and being detachably mounted in connection with the handle members without removing the pivotal connection of said handle members, and bushings mounted in the handle members where pivotally connected together.

3. A tool of the class described comprising pivotally connected handle members, blade members formed independently of said handle members and adapted to be secured to the separate handle members, means passed through said blade members and into said handle members for detachably connecting said blade members with said handle members, said blade members overlying the pivotal connection of the handle members and being detachably mounted in connection with the handle members without removing the pivotal connection of said handle members, bushings mounted in the handle members where pivotally connected together, and other bushings mounted in said handle members to receive the means for securing blade members thereto.

4. A tool of the class described comprising pivotally connected handle members, blade members formed independently of said handle members and adapted to be secured to the separate handle members, means passed through said blade members and into said handle members for detachably connecting said blade members with said handle members, said blade members overlying the pivotal connection of the handle members and being detachably mounted in connection with the handle members without removing the pivotal connection of said handle members, bushings mounted in the handle members where pivotally connected together, other bushings mounted in said handle members to receive the means for securing blade members thereto, and means for keying said bushings against rotation and for retaining same against displacement.

5. A tool of the class described comprising pivotally connected handle members, blade members formed independently of said handle members and detachably connected therewith without detaching the pivotal connection of the handle members, bushings mounted in said handle members, means passed through said blade members and into said bushings for detachably securing said blade members in connection with said handle members, bushings mounted in said handle members where pivotally connected together, means for keying said bushings against rotation and for retaining said bushings against displacement, and said blade members being adapted to conceal the pivotal connections of said handle members.

6. In a pair of shears of the class described, two handle members provided at one end with finger pieces and at the other end with apertures adapted to receive bushings, means passed through the bushings mounted in the apertures of said handle members for pivotally connecting said handle members, means for preventing the rotation of said bushings, and other bushings mounted in said handle members in spaced relation and keyed against rotation.

7. In a pair of shears of the class described, two handle members provided at one end with finger pieces and at the other end with apertures adapted to receive bushings, means passed through the bushings mounted in the apertures of said handle members for pivotally connecting said handle members, means for preventing the rotation of said bushings, other bushings mounted in said handle members in spaced relation and keyed against rotation, and blade members detachably mounted in connection with the handle members by means passed through said blade members and into the last named bushings of the handle members.

8. In a pair of shears of the class described, two handle members provided at one end with finger pieces and at the other end with apertures adapted to receive bushings, means passed through the bushings mounted in the apertures of said handle members for pivotally connecting said handle members, means for preventing the rotation of said bushings, other bushings mounted in said handle members in spaced relation and keyed against rotation, blade members detachably mounted in connection with the handle members by means passed through said blade member and into the last named bushings of the handle members, and said blade members concealing the pivotal connection of the handle members.

9. A pair of shears of the class described comprising two substantially similar handle members formed from cast metal and two substantially similar blade members formed from hard sheet metal, hard metallic bushings mounted in and keyed to said handle members, a screw passed through one of the bushings in each of the handle members for pivotally connecting said handle members, and other screws passed through said blade members and into the other bushings of said handle members for detachably securing said blade members to the pivotally connected handle members.

10. A pair of shears of the class described comprising two substantially similar handle members formed from cast metal and two substantially similar blade members formed from hard sheet metal, hard metallic bushings mounted in and keyed to said handle members, a screw passed through one of the bushings in each of the handle members for pivotally connecting said handle members, other screws passed through said blade members and into the other bushings of said handle members for detachably securing said blade member to the pivotally connected handle members, and a lock nut for retaining the pivotal connection of the handle members in predetermined position.

11. A pair of shears of the class described comprising two substantially similar handle members formed from cast metal and two substantially similar blade members formed from hard sheet metal, hard metallic bushings mounted in and keyed to said handle members, a screw passed through one of the bushings in each of the handle members for pivotally connecting said handle members, other screws passed through said blade members and into the other bushings of said handle members for detachably securing said blade member to the pivotally connected handle members, a lock nut for retaining the pivotal connection of the handle members in predetermined position, and said blade members overlapping and concealing the pivotal connections of the handle members.

12. A pair of shears of the class described comprising two substantially similar handle members formed from cast metal and two substantially similar blade members formed from hard sheet metal, hard metallic bushings mounted in and keyed to said handle members, a screw passed through one of the bushings in each of the handle members for pivotally connecting said handle members, other screws passed through said blade members and into the other bushings of said handle members for detachably securing said blade member to the pivotally connected said blade member to the pivotally connected handle members, a lock nut for retaining the handle members in pivotal connection of the handle members in predetermined position, said blade members overlapping and concealing the pivotal connections of the handle members, and the inner adjacent faces of the bushings through which the pivoted screw passes being comparatively wide to form a bearing face on which the handle members are free to operate.

13. A pair of shears of the class described comprising two substantially similar handle members formed from cast metal and two substantially similar blade members formed from hard sheet metal, hard metallic bushings mounted in and keyed to said handle members, a screw passed through one of the bushings in each of the handle members for pivotally connecting said handle members, other screws passed through said blade members and into the other bushings of said handle members for detachably securing said blade member to the pivotally connected handle members, a lock nut for retaining the pivotal connection of the handle members in predetermined position, said blade members overlapping and concealing the pivotal connections of the handle member, the inner adjacent faces of the bushings through which the pivoted screw passes being comparatively wide to form a bearing face on which the handle members are free to operate, and all of said bushings being retained against displacement in the handle members.

In testimony that I claim the foregoing as my invention I have signed my name this 21st day of July, 1923.

CHARLES DRIEST, Jr.